US006310452B1

(12) United States Patent
Deck et al.

(10) Patent No.: US 6,310,452 B1
(45) Date of Patent: Oct. 30, 2001

(54) SINGLE CYCLE POSITIONING SYSTEM UTILIZING A DC MOTOR

(75) Inventors: Gary Lee Deck, Bethel; Douglas Sebastian Pfautz, Landisville; Michael David Strong, Mechanicsburg, all of PA (US)

(73) Assignee: Tyco Electronics Corp, Wilmington, DE (US)

( * ) Notice: Subject to any disclaimer, the term of this patent is extended or adjusted under 35 U.S.C. 154(b) by 0 days.

(21) Appl. No.: 09/591,643

(22) Filed: Jun. 9, 2000

(51) Int. Cl.[7] ............................................. H02P 3/00
(52) U.S. Cl. .................... 318/273; 318/286; 318/371; 318/375
(58) Field of Search .................................. 318/286, 273, 318/371, 375

(56) References Cited

U.S. PATENT DOCUMENTS

| 3,343,398 | 9/1967 | Kerns ...................................... 72/413 |
| 3,694,721 | * 9/1972 | Henry ................................... 318/341 |
| 3,819,997 | * 6/1974 | Morton et al. ........................ 318/258 |
| 3,911,342 | * 10/1975 | Herwig ................................. 318/373 |
| 4,124,812 | * 11/1978 | Naito et al. ........................... 318/371 |
| 4,132,934 | * 1/1979 | Morton et al. ........................ 318/382 |
| 4,633,154 | * 12/1986 | Maeda ................................... 318/373 |
| 5,033,187 | 7/1991 | Gloe et al. .............................. 29/753 |
| 5,449,990 | 9/1995 | Bowling et al. ...................... 318/607 |
| 5,789,885 | * 8/1998 | Seel ...................................... 318/375 |
| 5,831,403 | * 11/1998 | Kanki et al. ........................... 318/286 |

* cited by examiner

Primary Examiner—Robert E. Nappi
Assistant Examiner—Rita Leykin

(57) ABSTRACT

A single cycle positioning system utilizing a DC motor wherein a wide ranging incoming AC supply voltage is rectified and a fixed frequency variable duty cycle pulse width modulation is provided to apply a predetermined rms DC voltage to the motor for a single cycle of operation.

6 Claims, 3 Drawing Sheets

SINGLE CYCLE POSITIONING SYSTEM UTILIZING A DC MOTOR

BACKGROUND OF THE INVENTION

This invention relates to positioning systems and, more particularly, to an improved single cycle positioning system which utilizes a DC motor to accurately position a cyclicly movable member at a precise location within its movement cycle.

There are numerous machines where a member is cyclicly driven and it is required to stop the member at a precise location within its positional cycle. One such type of machine is a crimping press which is utilized repetitively to attach electrical terminals to the ends of wires. U.S. Pat. No. 3,343,398 discloses one such machine wherein a ram is coupled to a shaft and, during each single revolution of the shaft, the ram is moved downwardly and then back to its initial position thereby to move a crimping die on the end of the ram into engagement with a terminal. The shaft is coupled through a single revolution clutch to a flywheel which is continuously driven by a continuously operated motor. When it is desired to crimp a terminal onto a wire, the single revolution clutch is engaged to drive the shaft through a single revolution so that the ram is moved through its cycle.

While the aforedescribed arrangement is effective for its intended purpose, it suffers from a number of disadvantages. Thus, for example, the continuous running of the motor is wasteful of electrical energy and results in the generation of heat. Also, the use of a single revolution clutch causes noise and vibration. Further, the clutch has to be properly maintained and worn parts replaced.

U.S. Pat. No. 5,449,990, discloses a single cycle positioning system which substitutes electronic control of an induction motor for a single revolution clutch. While effective and well received in the industry, the electronic control system for operating the induction motor is relatively expensive. It would therefore be desirable to provide a lower cost single cycle positioning system of the type described.

SUMMARY OF THE INVENTION

In accordance with this invention, there is provided a single cycle positioning system utilizing a DC motor having a winding with two ends. The system comprises a source of DC power, a movable member coupled to the motor for controlled cyclical movement thereby, means for providing a start signal to initiate movement of the member, and means associated with the member for providing a stop signal when the member is at a predetermined position within its cycle of movement. A motor controller in the system includes a first switch coupled between the DC power source and a first end of the motor winding, a second switch coupled between the second end of the motor winding and a reference level, and a third switch coupled between a first end of the motor winding and the reference level. The system also includes a control means coupled to receive the start signal and the stop signal for controlling the motor control switches. The control means is operative in response to the start signal for controlling closure of the first and second switches so as to apply DC power to the winding of the motor. The control means is operative in response to the stop signal for opening the first switch and closing the second and third switches to effect a dynamic braking of the motor so that the movable member comes to rest at a desired position within a defined range of the predetermined position.

In accordance with an aspect of the present invention, the source of DC power includes a pair of terminals connected to a source of AC power and rectification means coupled to the pair of terminals and effective to convert AC power applied to the terminals to DC power. The control means is operative to determine the AC voltage across the pair of terminals and to pulse width modulate closure of the second switch at a rate inversely related to the determined AC voltage so as to provide a predetermined effective DC voltage across the motor winding after receipt of the start signal and before receipt of the stop signal.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
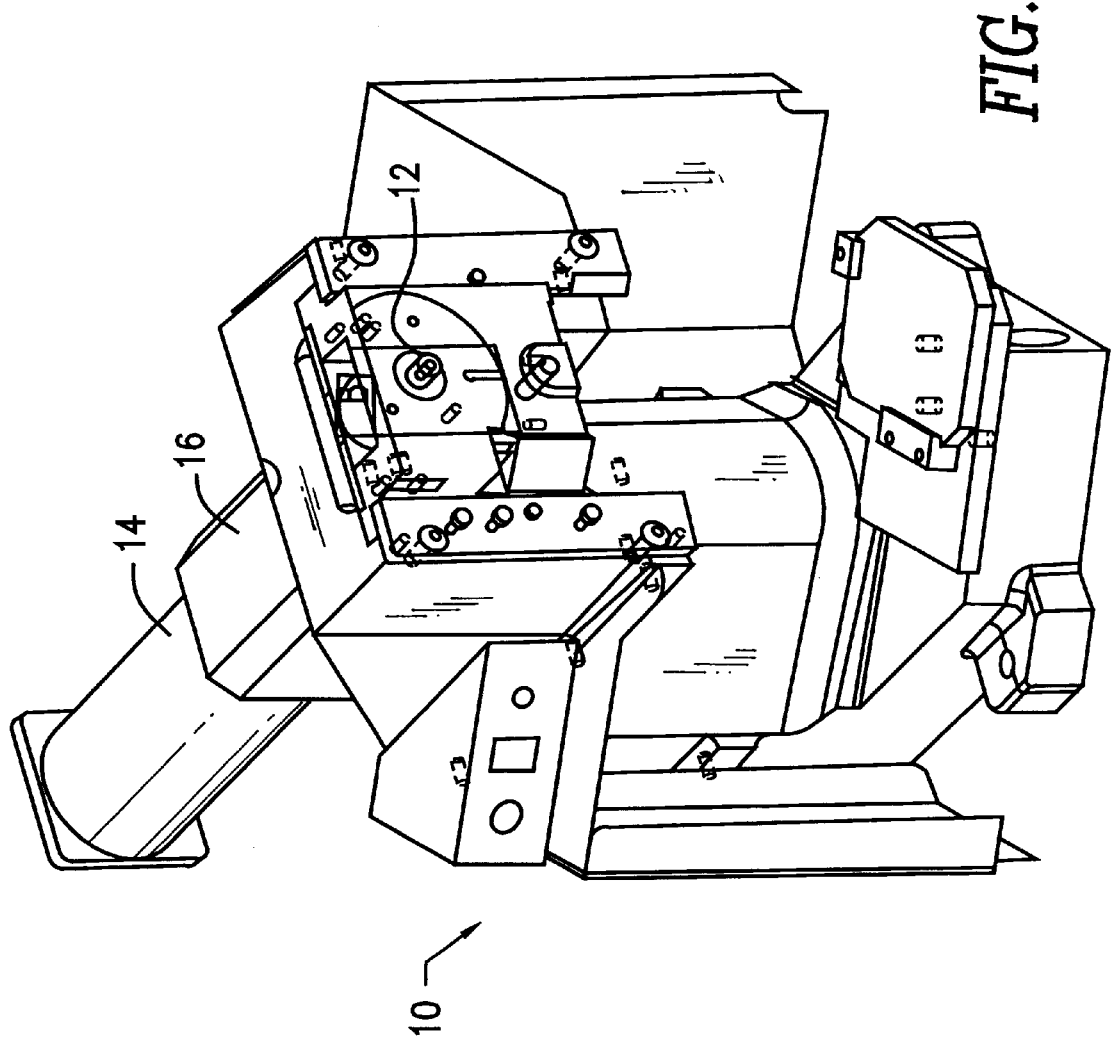
FIG. 1 is an isometric view of a crimping press (without applicator) in which the present invention may be incorporated.

FIG. 1 illustrates a crimping press, designated generally by the reference numeral 10, in which a system constructed in accordance with the principles of this invention may be incorporated. For purposes of illustration, the crimping press 10 is shown without an applicator, it being understood that various applicators may be installed thereon and coupled to the output shaft 12. The output shaft 12 is in turn coupled to the DC motor 14 through a gear box 16, which illustratively provides a 10:1 reduction from the shaft (not shown) of the motor 14 to the shaft 12.

Figure 2:
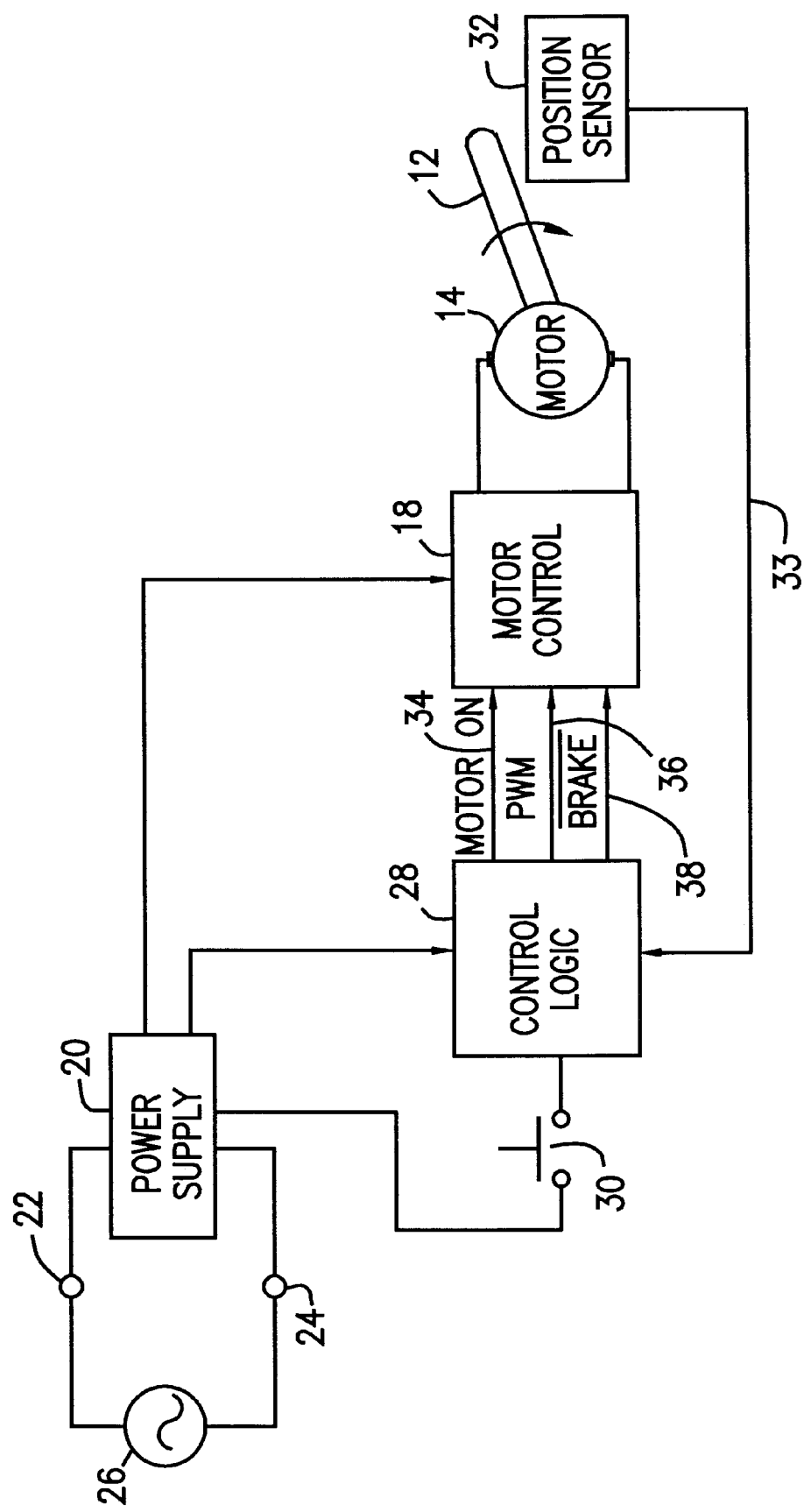
FIG. 2 is an overall block diagram of an illustrative embodiment of a single cycle positioning system constructed in accordance with the principles of this invention.

As shown in FIG. 2, the single winding of the DC motor 14 is connected to the motor control circuit 18. (For simplification purposes, the gear box 16 is not shown in FIG. 2). The motor control circuit 18 receives power from the power supply 20 which has a pair of terminals 22, 24 connected to a source of AC power 26. As will be described hereinafter, the system shown in FIG. 2 can operate with a wide ranging incoming AC supply voltage. The motor control circuit 18 is provided with control signals from the control logic circuitry 28, which may include a programmed microprocessor. The control logic circuitry 28 receives power from the power supply 20 and also receives a start signal from the switch 30, which may be a foot operated switch which an operator actuates to initiate a single crimping cycle. A position sensor 32, which may include a Hall effect device, is coupled to the shaft 12 to provide a stop signal to the control logic circuitry 28 over the lead 33 when the shaft 12 is at a predetermined angular orientation. As will be described, the control logic circuitry 28 responds to closure of the start switch 30 to provide a MOTOR ON signal over the lead 34 to the motor control circuit 18 and a fixed frequency, variable duty cycle, pulse width modulation (PWM) signal over the lead 36 depending upon the value of the AC voltage across the terminals 22, 24. In response to a signal from the position sensor 32, the MOTOR ON signal over the lead 34 is removed and a $\overline{\text{BRAKE}}$ signal over the lead 38 is provided.

Figure 3:
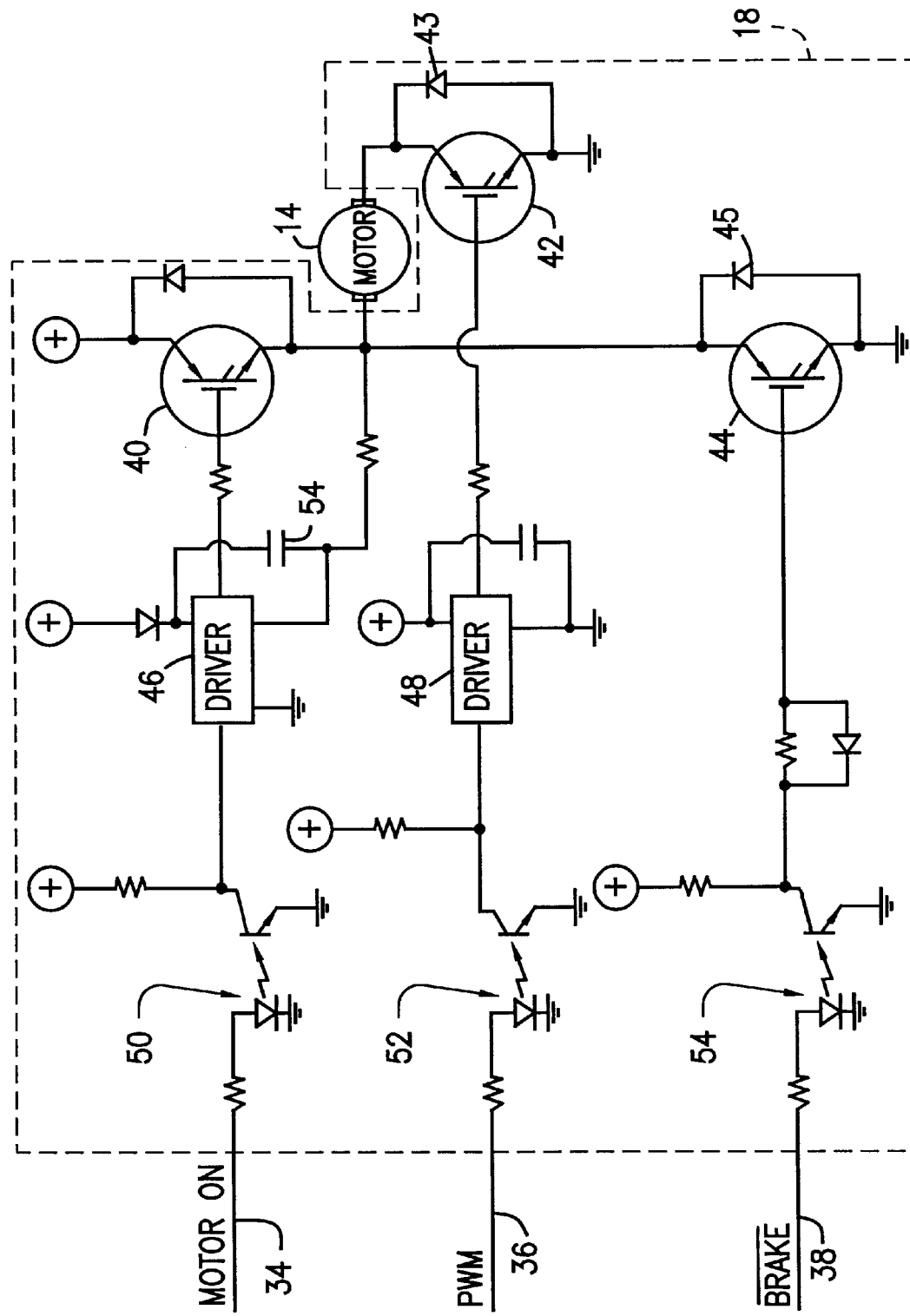
FIG. 3 is a schematic circuit diagram of an illustrative embodiment of motor control circuitry constructed in accordance with the principles of this invention.

As shown in FIG. 3, control of the motor 14 is effected through three semiconductor switches 40, 42, and 44, each of which is illustratively an insulated gate bipolar transistor (IGBT). The switches 40 and 42 are connected in a half "H-bridge" configuration to control the running of the motor 14, and the switch 44 is connected to provide a means for dynamic braking of the motor 14. The control signals over the leads 34, 36 and 38 from the control logic circuitry 28 are optically isolated from the drivers 46 and 48 for the switches 40 and 42 by the opto-isolators 50 and 52, respectively. The switch 44 is driven directly from the opto-isolator 54, in response to a signal over the lead 38. Thus, as shown, the winding of the motor 14 has a first end which can be connected to the DC power source through the switch 40 and a second end which can be connected to ground through the switch 42. The brake switch 44 provides a path to ground for the first end of the winding of the motor 14. (It will be appreciated that a different reference level can be selected in place of ground.)

The power supply 20 (FIG. 2) produces a DC voltage level proportional to the incoming AC line voltage from the source 26. For an AC line voltage of 90 VACrms, the corresponding DC voltage available to the motor 14 will be approximately 130 VDC. For an AC line voltage of 260 VACrms, the DC voltage will be approximately 375 VDC. Illustratively, the motor 14 is designed for operation at 130 VDC. By alternately closing and opening the switch 42, DC voltages in excess of the rated motor voltage can be applied at an effective level of 130 VDC. Thus, the control logic circuitry 28 senses the voltage from the AC source 26 and performs the switching of the switch 42 at a fixed frequency, approximately 20 Khz, and with a duty cycle directly inversely proportional to the relationship between the incoming AC line voltage and the 130 VDC motor rating. The AC line voltage is measured by the control logic circuitry 28. For an AC line voltage of 90 VAC, the duty cycle of the switching frequency will be approximately 100%, indicating that the switch 42 will be closed continuously. For an AC line voltage of 260 VAC (375 VDC) the duty cycle will be 35%. Thus, pulse width modulating closure of the switch 42 is utilized to provide an rms 130 VDC level to the winding of the motor 14.

During normal operation, the control logic circuitry 28 monitors the condition of the switch 30. When the switch 30 is closed, a cycle is initiated. The switch 44 is initially closed for a predetermined amount of time. With the switch 44 closed, the capacitor 54 will charge up to approximately +12 VDC. The switch 44 is then opened. A signal is then applied over the lead 34 to close the switch 40. The charge stored on the capacitor 54 provides the necessary charge to close the switch 40. The switch 42 will then be pulsed closed at a fixed rate and with a duty cycle depending upon the value of the AC line voltage. When both the switches 40 and 42 are conducting, the winding of the motor 14 will be connected to the motor power supply and will start to rotate. This continues until the position sensor 32 indicates that the shaft 12 is at the predetermined angular position. The control logic circuitry 28 will then stop pulsing the switch 42 and will open the switch 40. The motor will then be dynamically braked to a stop by shorting the motor winding leads together. This is accomplished by closing both the switches 42 and 44. With both the switches 42 and 44 conducting, and in concert with the associated flyback diodes 43 and 45, a path exists for the resulting braking current to flow through the two switches 42, 44 and associated diodes 43, 45 and back to the winding of the motor 14. The switches 42 and 44 remain closed for a predetermined amount of time, and then are opened. During that predetermined time, the motor 14 will come to a complete stop. Energy stored in the winding of the motor 14 will be dissipated through the motor winding resistance and will appear as heat in the motor winding. The system then waits for the operator to initiate another cycle via the switch 30.

While the foregoing sequence for dynamically braking the motor 14 is effective, it has been found that when applied to a crimping press (FIG. 1), the heat generated by the dynamic braking limits the repetition rate of the crimping. It is known that crimping occurs a fixed time after receipt of the start signal from the switch 30 and that the crimping ram then moves upwardly to its top dead center position, which is when the position sensor 32 provides its signal over the lead 33. Accordingly, it has been found advantageous to reduce the pulse width modulation closure duty cycle of the switch 42 after the crimping occurs and before receipt of the signal from the position sensor 32, at which time the aforedescribed dynamic braking is effected. Specifically, it has been found that by decreasing the pulse width modulation duty cycle to sixty percent (60%) of its initial value (in effect providing an approximately rms 78 VDC level to the winding of the motor 14) this results in a thirty percent (30%) or more increase in the crimping repetition rate.

Accordingly, there has been disclosed an improved single cycle positioning system utilizing a DC motor. While an illustrative embodiment of the present invention has been disclosed herein, it is understood that various adaptations and modifications to the disclosed embodiment are possible and it is intended that this invention be limited only by the scope of the appended claims.

What is claimed is:

1. A single cycle positioning system utilizing a DC motor having a winding with two ends, comprising:

a source of DC power;

a movable member coupled to said motor for controlled cyclical movement thereby;

means for providing a start signal to initiate movement of said member;

means associated with said member for providing a stop signal when said member is at a predetermined position within its cycle of movement;

a motor controller including:
  a first switch coupled between said DC power source and a first end of the motor winding;
  a second switch coupled between the second end of the motor winding and a reference level; and
  a third switch coupled between the first end of the motor winding and the reference level; and control means coupled to receive said start signal and said stop signal for controlling said motor control switches, said control means being operative in response to said start signal for controlling the closure of said first and second switches so as to apply DC power to the winding of said motor, and said control means being operative in response to said stop signal for opening said first switch and closing said second and third switches to effect a dynamic braking of said motor so that said movable member comes to rest at a desired position within a defined range of said predetermined position;

wherein said source of DC power includes a pair of terminals connectable to a source of AC power and rectification means coupled to said pair of terminals and effective to convert AC power applied to said terminals to DC power, and wherein said control means is operative to determine the AC voltage across said pair of terminals and to pulse width modulate closure of the second switch at a rate inversely related to the determined AC voltage so as to provide a predetermined rms DC voltage across the motor winding after receipt of said start signal and before receipt of said stop signal.

2. The system according to claim 1 wherein each of said switches comprises a respective insulated gate bipolar transistor.

3. The system according to claim 1 wherein:

said control means is operative in response to receipt of said start signal to cause the closure of said first switch and to cause a pulsing closure of said second switch at a fixed rate with a duty cycle selected to provide a predetermined rms DC voltage across the motor winding; and said control means is operative in response to receipt of said stop signal to cause the opening of said first switch and the continuous closure of said second and third switches for a predetermined time duration.

4. The system according to claim 1 wherein:

said control means is operative in response to receipt of said start signal to cause the closure of said first switch and to cause a pulsing closure of said second switch at a fixed rate with a duty cycle selected to provide a predetermined rms DC voltage across the motor winding for a predetermined time and to thereafter reduce the predetermined rms DC voltage across the motor winding until receipt of said stop signal; and said control means is operative in response to receipt of said stop signal to cause the opening of said first switch and the continuous closure of said second and third switches for a predetermined time duration.

5. The system according to claim 4 wherein said control means is effective at said predetermined time after receipt of said start signal to reduce the rms DC voltage across the motor winding to about sixty percent (60%) of said predetermined rms DC voltage.

6. The system according to claim 1 wherein the reference level is ground.

* * * * *